Figure 1:
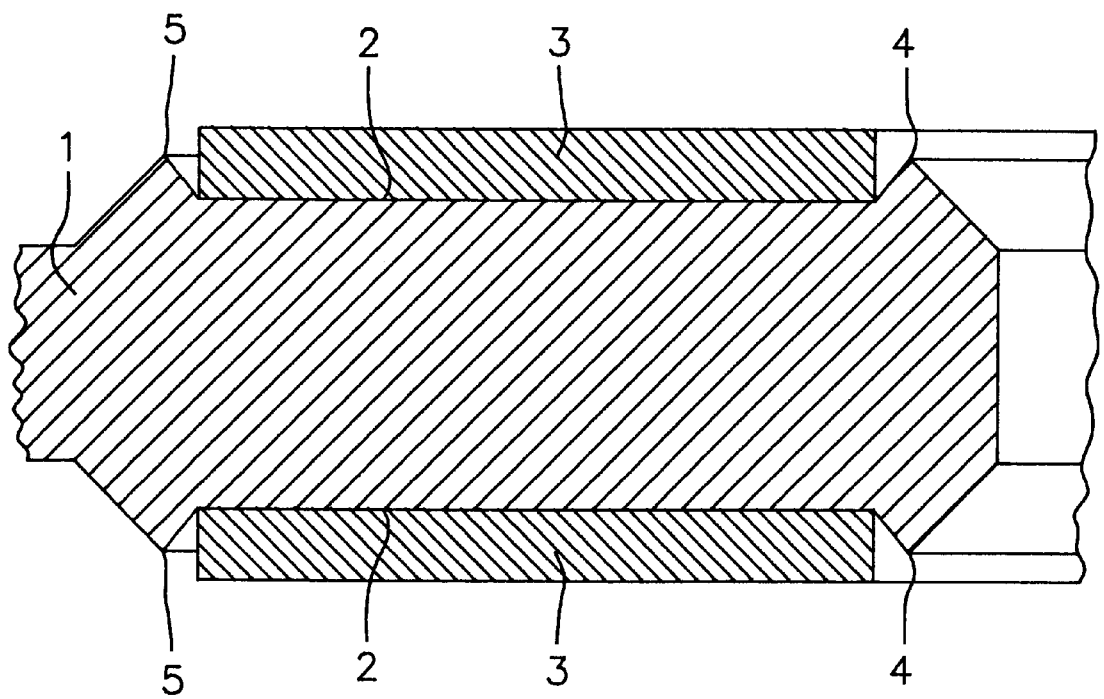

United States Patent [19]
Jung

[11] Patent Number: 5,927,723
[45] Date of Patent: Jul. 27, 1999

[54] SEAL CONFIGURATION FOR A FLAT FLANGE JOINT

[76] Inventor: Alfred H. Jung, Birresborner Strasse 4, Cologne, Germany, D-50935

[21] Appl. No.: 08/913,328
[22] PCT Filed: Mar. 9, 1996
[86] PCT No.: PCT/EP96/01027
 § 371 Date: Sep. 15, 1997
 § 102(e) Date: Sep. 15, 1997
[87] PCT Pub. No.: WO96/28671
 PCT Pub. Date: Sep. 19, 1996

[30] Foreign Application Priority Data

Mar. 15, 1995 [DE] Germany ............... 295 04 402 U
Mar. 31, 1995 [DE] Germany ............... 295 05 539 U

[51] Int. Cl.$^6$ ............... B65P 53/00; F16J 9/00; F16K 41/00
[52] U.S. Cl. ............................................. 277/572
[58] Field of Search ............................. 277/572, 573, 277/549, 560, 312, 314, 500; 73/299, 256; 384/121

[56] References Cited

U.S. PATENT DOCUMENTS 3,698,725 10/1972 Klabunde ............................. 277/566
4,020,690 5/1977 Samuels et al. .................... 73/299
5,222,425 6/1993 Davies ................................ 91/273

FOREIGN PATENT DOCUMENTS 0 191 171 8/1986 European Pat. Off. .
4139453 6/1992 Germany .
2 170 283 7/1986 United Kingdom .

*Primary Examiner*—William Oen
*Attorney, Agent, or Firm*—Jacobson, Price, Holman & Stern, PLLC

[57] ABSTRACT

The present invention pertains to a seal configuration for a flat flanged joint with a base part whose even seal reception surfaces are each bounded by an inner and an outer annular tooth and with two adhered seal bearings which, in a mounted condition, are confined between the flange surfaces, annular teeth and the base part. Due to the seal surfaces being even, the seal bearing is capable of flowing free within this chamber, especially when the flange surfaces are tilted with respect to the base part. Further, it is suggested to prepare the annular teeth and the even reception surcaes of the base part by embossing or milling. The following advantages are achieved: uniform surface pressure and thus good leakage performance, high blow-off safety, high component safety, low production costs, low mounting height, low notch stress cracking and low stress corrosion cracking.

10 Claims, 3 Drawing Sheets

(exaggerated representation)

SEAL CONFIGURATION FOR A FLAT FLANGE JOINT

The present invention pertains to a seal configuration for a flat flanged joint according to the preamble of claim 1.

Such a seal configuration can be seen from DE 41 39 453 A1. In this case, the two seal reception surfaces of the base part have annular teeth. On either side of the base part, the radially innermost tooth and the radially outermost tooth have a higher design than the intermediate teeth. Upon insertion of the seal, which consists of a conveniently metallic base part and the two seal bearings, this results in confinement of the seal bearings within a chamber, i.e. the seal bearings are embedded between the respective inner and outer teeth, and the seal bearing cannot creep inward or outward beyond the inner or outer tooth.

In the known prior art, the annular teeth in the region of the seal reception surfaces are produced by turning on a lathe. This requires special tools and correspondingly long processing times.

Seal configurations having annular teeth are fundamentally distinct from metal seal configurations with force shunt seals in which the desired surface pressure at the sealing surfaces is reduced by force shunt. However, this also reduces the sealing performance. Although the generic seal configurations with annular teeth do not exhibit this drawback, they always require fastening with torque-controlled wrenches.

The seal having annular teeth known from DE 41 39 453 A1 has proven very successful, but involves a relatively cumbersome preparation due to the annular teeth present in the region of the seal reception surfaces. Further, it has been the general opinion that the teeth on the seal reception surfaces were indispensable for achieving a good leakage performance.

It has been the object of the invention to provide an improved seal configuration for flat flanged joints with annular teeth which can be prepared with less costs while exhibiting at least the same leakage performance, blow-off safety and component safety as the configuration according to the known prior art. At the same time, the mounting height is to be decreased and the risk of notch stress cracking and stress corrosion cracking reduced.

This object is achieved by the features of a seal configuration for a flat flanged joint with a flat base part (1) having seal-reception services (2) on either side, each with an inner annular tooth and an outer annular tooth which bound either seal- reception surface on its radial inside and outside, respectively, and having two annular seal bearings (3) which are respectively adhered to the seal-reception services and which, in a mounted condition, are embedded and confined in a chamber between the annular teeth, characterized in that each seal-reception surface has an even design.

Due to the fact that every seal reception surface has an even design in the configuration according to the invention, the tedious turning of the annular teeth in the region of the seal reception surfaces is omitted.

Surprisingly, the omission of annular teeth in this region does not result in a more unfavorable leakage performance. Rather, due to the absence of those annular teeth, the seal bearing can evenly spread throughout the seal reception surface within the chamber without being hindered by the teeth. In an ideal mounting of the seal, as may occur at low pressure, the even flange surfaces remain practically in parallel. In contrast, high screw fastening torques result in the flange surfaces being no longer exactly in parallel, but rather closer together on the radial outside than they are on the radial inside. This effect also causes a flowing of the seal bearings. It is necessary that just in the cases of non-ideal mounting which actually occur in practice, the seal bearings be capable of flowing free within the respective chamber.

A uniform surface pressure throughout the region of the seal reception surface is achieved thereby. This is not sufficiently possible in the case of annular teeth being present in the region of the seal reception surfaces since the teeth prevent the seal bearing from flowing which results in a non-uniform surface pressure. This effect of non-uniform surface pressures is even more pronounced in non-chambered grooved seals, i.e. which have annular teeth throughout the region of the seal reception surfaces, but no elevated inner and outer teeth.

In the seal configuration according to the invention, the presence of even seal reception surfaces also results in a lower mounting height since the distance between the two seal reception surfaces can be chosen smaller than with a seal having annular teeth in the region of the seal reception surfaces, or with a conventional grooved seal (without inner and outer teeth).

A further, unpredictable advantage of the seal configuration according to the invention is that the graphite will not cake with the metallic surfaces of the seal so that it can be inexpensively and simply cleaned and reused.

A particularly advantageous preparation is by milling or embossing the seal reception surfaces and the inner and outer teeth. Thus, turning on a lathe for preparing the teeth and the even seal reception surface can be omitted. In the base parts known to date, stress corrosion occurs in certain applications. Such a risk is less important in milled or embossed base parts since the milling cutter or embossing die yields a surface which is different from that produced by turning on a lathe. This applies to both the macro range, for an embossing die has a more rounded surface than that of a turning cutter, and the micro range. A turned surface is less smooth in the micro range than an embossed one, and thus the turned surface is more subject to stress corrosion cracking. Thus, the surface produced by embossing is less endangered with respect to stress corrosion cracking, but also notch stress cracking.

The novel seal configuration is further illustrated in the accompanying figures.

Figure 2:
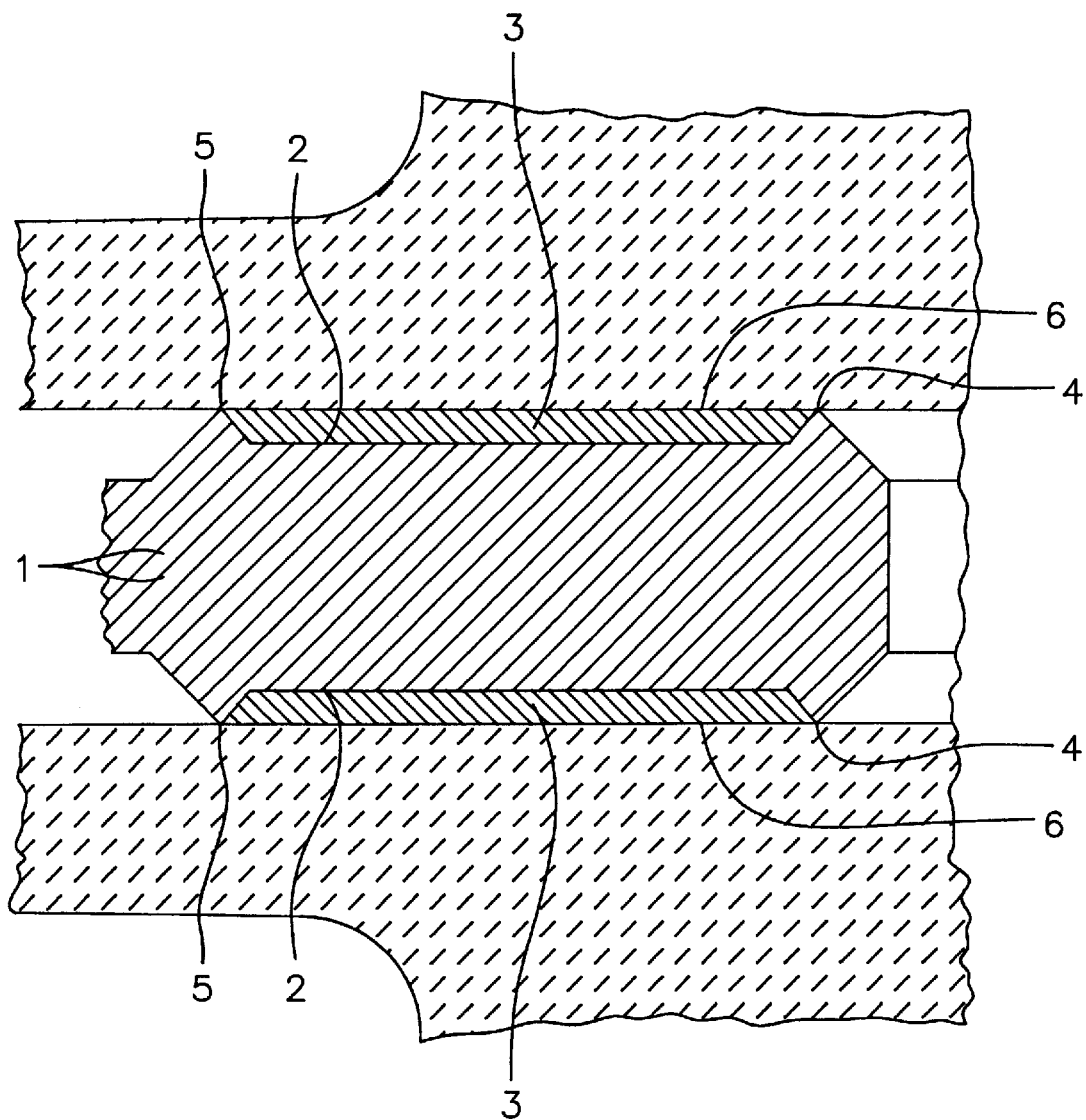
Figure 3:
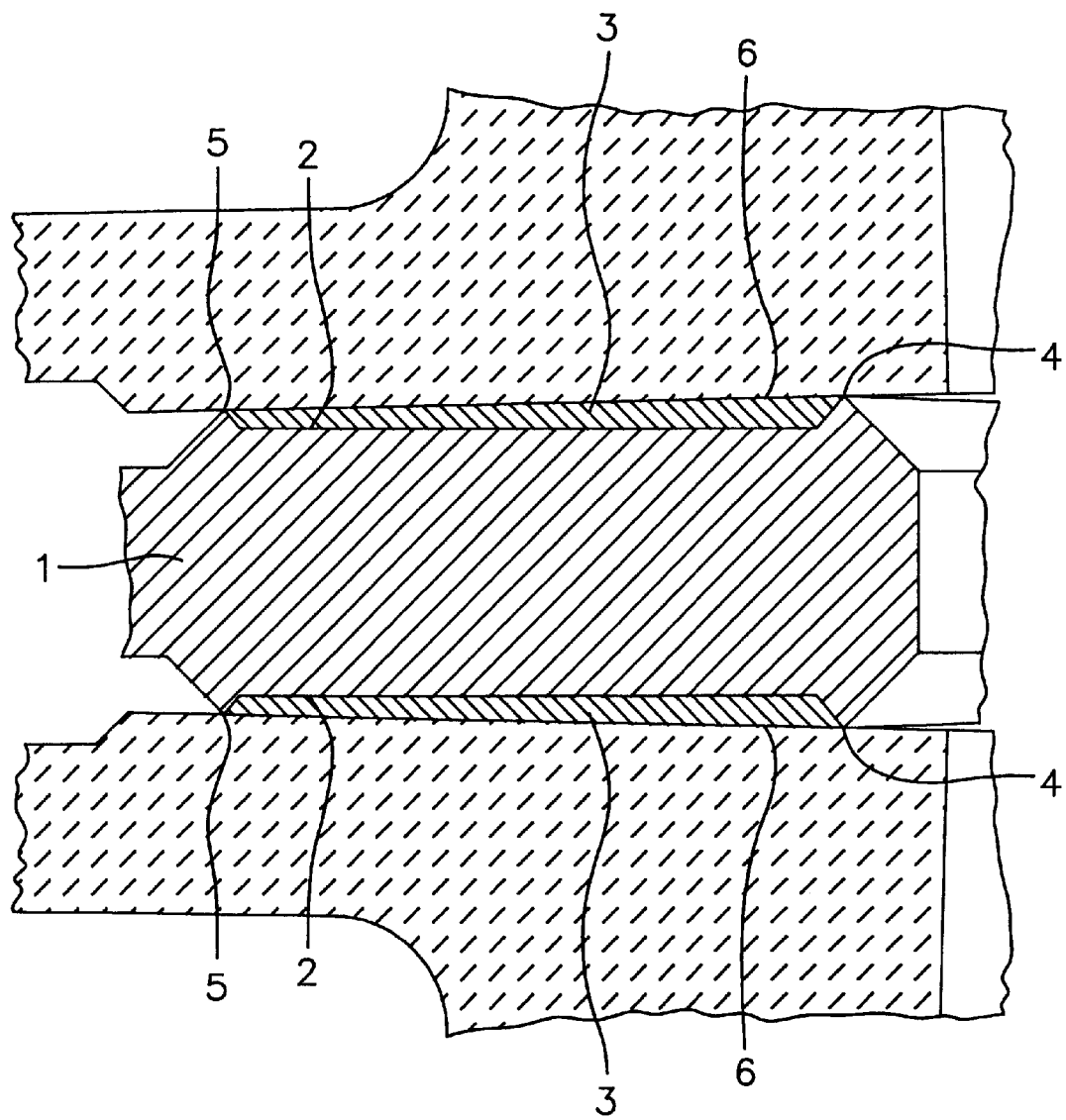

FIG. 1 segment of a typical seal in cross-section in a non-mounted condition;

FIG. 2 the seal according to FIG. 1 with ideal mounting;

FIG. 3 the seal according to FIG. 1 with real mounting (schematic).

FIG. 1 shows a seal in a non-mounted condition. The base part (1) which is preferably made of metal has even seal reception surfaces (2) on either side onto which the seal bearings (3) are adhered. These are made of graphite or PTFE, in particular. The adhesive is conveniently applied by spraying and should be free of chloride in order to prevent stress corrosion cracking if possible. On the radial inside and the radial outside, respectively, there is an inner annular tooth (4) and an outer annular tooth (5) on each of the seal reception surfaces.

FIG. 2 shows the seal according to FIG. 1 in a mounted condition, i.e. in ideal mounting, as can occur, for example, at low pressures. In this case, the flange bearing surfaces (6), and thus the two bearing surfaces of a seal bearing, are practically in parallel. Either seal bearing in confined within a chamber between the inner and outer teeth, attaching itself to these teeth.

FIG. 3 shows, in a somewhat exaggerated representation, the seal in real mounting, as can occur, for example, at high fastening torques and high pressures. The flange bearing surfaces are not exactly in parallel, but are closer together on the outside than they are on the inside. Just in this case, the possibility for the seal bearings to flow is very important for a uniform surface pressure to result.

Particularly good properties are exhibited by a seal in which, as shown in FIG. 3, the inner annular tooth (4) has a slightly higher design than the outer annular tooth (5). The difference in height between the annular teeth is from 10 to 100 μm depending on the flange size and the mutual distance of the annular teeth. This results in the seal bearings being optimally sealed outwardly and inwardly in flanged joints for very high pressures which are accordingly screwed together very tightly.

I claim:

1. A seal configuration for a flat flanged joint with a flat base part (1) having seal reception surfaces (2) on either side, each with an inner annular tooth and an outer annular tooth which bound either seal reception surface on its radial inside and outside, respectively, and having two annular seal bearings (3) which are respectively adhered to the seal reception surfaces and which, in a mounted condition, are embedded and confined in a chamber between the annular teeth, characterized in that each seal reception surface has an even design.

2. The seal configuration according to claim 1, characterized in that each seal reception surface and the inner and outer annular teeth are prepared by milling or embossing.

3. The seal configuration according to claim 1, characterized in that the inner annular tooth (4) has a slightly higher design than the outer annular tooth (5).

4. A method for the preparation of seal configurations according to claim 1, characterized in that said annular teeth are milled or embossed.

5. A seal for a flat flanged joint, said seal comprising a) a flat base part having opposite sides and on each of said opposite sides a continuous, even, seal-reception surface bounded, radially, by a continuous inner annular tooth and a continuous outer annular tooth, and b) a compressible continuous annular seal bearing adhered to each seal-reception surface, whereby, when said seal is mounted in a flat flanged joint, said annular teeth on each side of the seal meet a flat flange, forming a chamber on each side of the seal between the seal and each flat flange of the joint, which chamber lies between said inner and outer radial teeth, which chamber holds embedded and confined therein all of said seal bearing.

6. The seal according to claim 5, wherein the seal bearing completely fills the chamber formed when the seal is mounted in the joint.

7. The seal according to claim 5, wherein the inner annular tooth extends higher than the outer annular tooth from the base of said seal.

8. A method for preparing the seal according to claim 5 comprising milling or embossing a work piece to form the seal-reception services and the inner and outer annular teeth.

9. An embossing die for forming the seal according to claim 5, said die corresponding to the even seal-reception surface and the inner and outer annular teeth.

10. A flat flanged joint comprising the seal according to claim 5 sandwiched between and sealing together two flat flanges.

* * * * *